May 24, 1966  E. JONES  3,252,475
PIERCING VALVE
Filed July 19, 1965  3 Sheets-Sheet 1
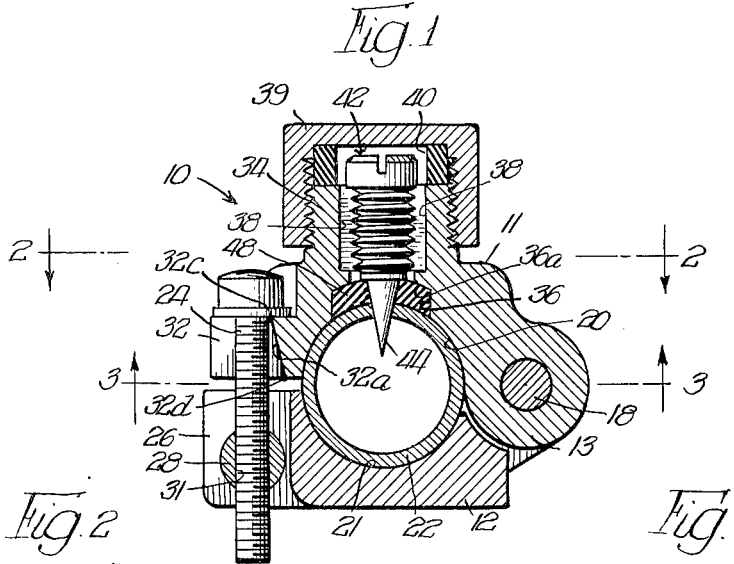
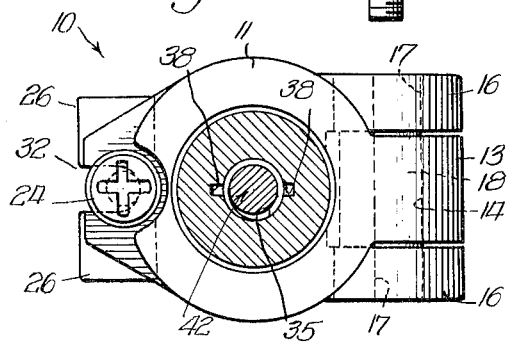
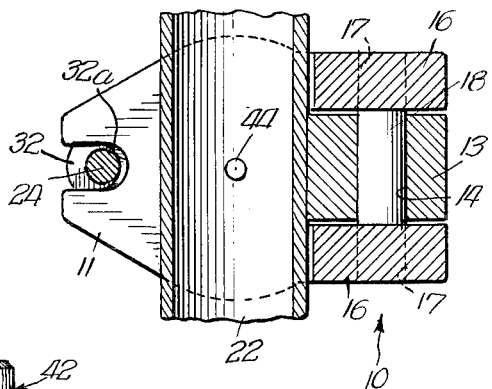
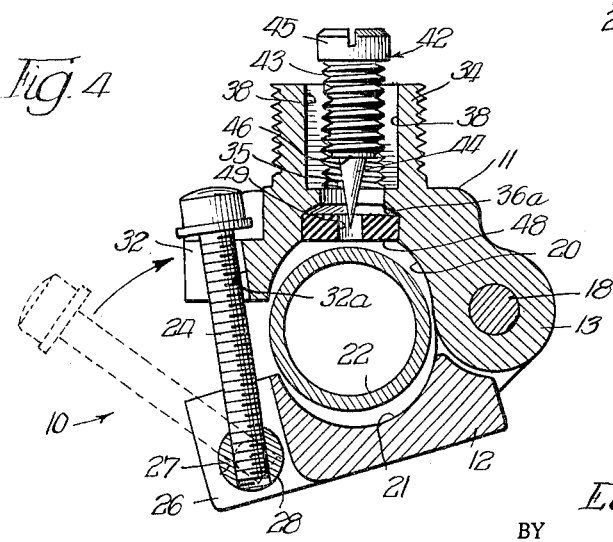
INVENTOR.
Evan Jones,
BY
Strict, Lockwood, Greenawalt & Dewey.

May 24, 1966  E. JONES  3,252,475
PIERCING VALVE
Filed July 19, 1965  3 Sheets-Sheet 2
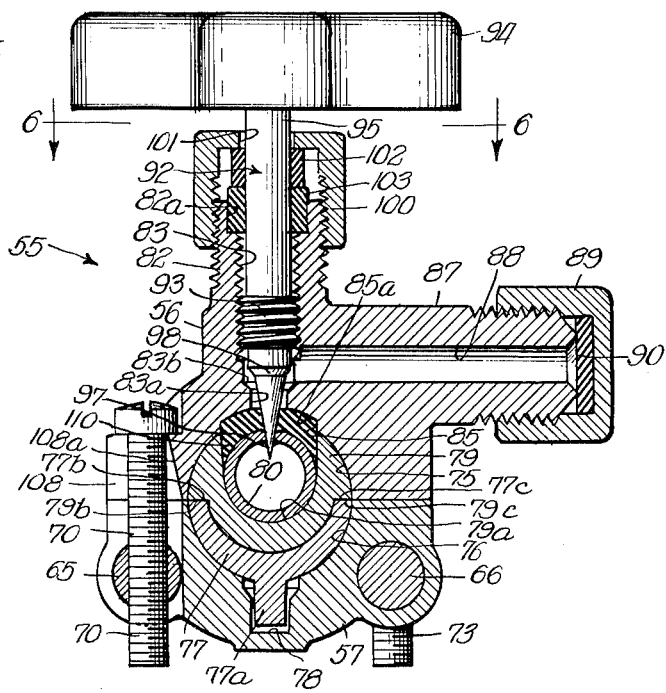
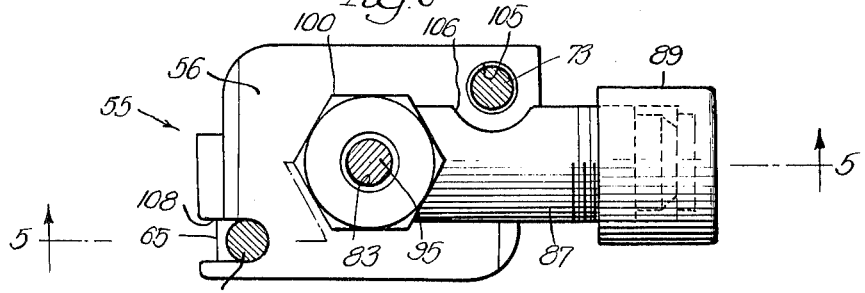
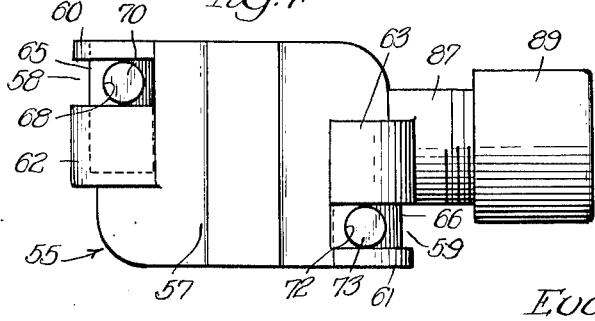
INVENTOR.
Evan Jones,
BY May 24, 1966  E. JONES  3,252,475
PIERCING VALVE Filed July 19, 1965  3 Sheets-Sheet 3

Inventor
Evan Jones
Strieh, Lockwell, Greenawalt & Dewey
Attys.

United States Patent Office 3,252,475
Patented May 24, 1966

3,252,475
PIERCING VALVE
Evan Jones, Evanston, Ill., assignor to Henry Valve Company, Melrose Park, Ill., a corporation of Illinois
Filed July 19, 1965, Ser. No. 477,341
5 Claims. (Cl. 137—318)

This application is a continuation-in-part of my application Serial No. 281,558 filed May 20, 1963, now abandoned.

This invention relates in a general way to valves, and more particularly to a new and improved self-piercing valve for affording access to hermetically sealed pressurized fluid systems.

Hermetically sealed fluid systems, such as refrigeration systems, quite often require puncturing or piercing for discharge or for recharge or the like. Self-piercing valves have been provided for affording access to such systems. Such self-piercing valves, which are adapted to be clamped to a refrigeration line, for example, usually include a valve body having two separate parts which are provided with respective, confronting arcuate or semi-cylindrical recesses for receiving a refrigeration line or conduit. The parts of the body member are conventionally clamped together on a conduit by nut and bolt means. One of the parts is provided with an internally threaded through bore adapted to receive a needle valve, which needle valve has a conical portion at the inner end thereof for piercing a hole in a refrigeration conduit when the valve body is clamped thereto. The valve body part having the needle valve therein is provided with suitable passageway means for communicating the hole formed in the refrigeration conduit with a suitable nipple on the valve body, which nipple is adapted to be engaged by an appropriate line for discharging or recharging purposes.

The above described piercing valve becomes a permanent part of the conduit to which it is clamped. Backing off of the needle valve after a hole has been formed in the conduit permits access to the latter for discharging or recharging, etc. Re-entry of the conical portion of the needle valve into the hole formed in the conduit closes off access to the latter. Rotation of the needle valve is accomplished by a suitable tapping tool. Some conduit piercing valves include as a part of the valve itself a suitable tool for actuation of the needle valve.

In the use of known piercing valves, problems have arisen in maintaining an effective seal around the hole formed in the conduit by the conical portion of the needle valve. Further, prior art piercing devices include two separate unattached parts which must be fastened together for clamping of the piercing device to a conduit thereby making assembly and clamping of such piercing valves on a conduit a somewhat awkward and time-consuming operation.

It is a principal object of this invention to provide a new and improved self-piercing valve which will be free from the disadvantages inherent in prior art piercing valves.

It is a further object of the present invention to provide a new and improved self-piercing valve having novel means for forming an effective seal around the hole formed in the conduit to which the valve is attached.

It is still further object of the present invention to provide a new and improved self-piercing valve adapted for quick and easy clamping engagement with a conduit or the like.

It is an even further object of the present invention to provide a new and improved self-piercing valve adapted for clamping engagement on conduits of different diameters.

These and other objects and advantages of the invention will become apparent from the following specification wherein like numerals refer to similar parts throughout.

In the drawings:

FIG. 1 is a vertical central section taken through one embodiment of the self-piercing valve of this invention, showing the valve clamped to a conduit;

FIG. 2 is a section taken along line 2—2 of FIG. 1;

FIG. 3 is a section taken along line 3—3 of FIG. 1;

FIG. 4 is a section similar to FIG. 1 showing the valve just before it is clamped to a conduit and before the needle valve has pierced a hole in the conduit;

FIG. 5 is a vertical section taken through a modified form of self-piercing valve of this invention, the section being taken along line 5—5 of FIG. 6;

FIG. 6 is a section taken along line 6—6 of FIG. 5 and showing the heads of the bolts removed for better illustration of the invention;

FIG. 7 is a bottom view of the piercing valve of FIG. 5;

Figure 8:
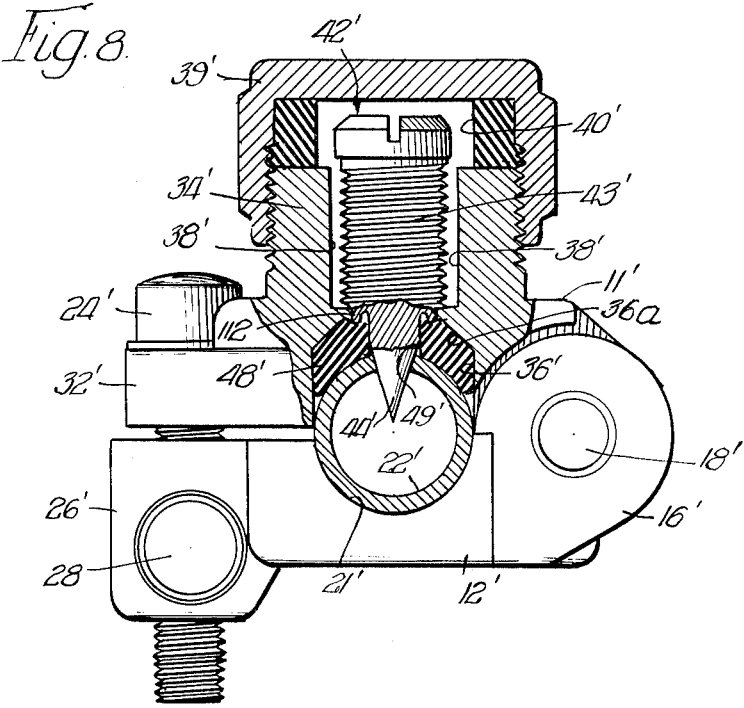
FIG. 8 is a section similar to FIG. 1 and showing another modification of the valve of this invention.

Referring now to the drawings and especially FIGS. 1 through 4, the self-piercing valve of this invention, generally designated 10, will be seen to include upper and lower body parts 11 and 12, respectively. Upper body part 11 includes an integral lug 13 at one end thereof, which lug includes a bore 14. Lower body part 12 includes a pair of integral spaced-apart lugs 16 at one end thereof adapted to receive lug 13 therebetween. Lugs 16 are provided with respective bores 17 adapted for alignment with bore 14 for receiving a pin 18. It will be apparent that body parts 11 and 12 are adapted for swinging movement with respect to each other about an axis defined by pin 18.

Body parts 11 and 12 are provided with respective arcuate or semi-cylindrical recesses 20 and 21, respectively, which recesses are of equal radius and adapted to confront each other (when the body parts are rotated or swung toward each other) to define a cylindrical opening for receiving a conduit 22. Body parts 11 and 12 are adapted to be clamped to conduit 22 by a bolt 24, which bolt is swingably and rotatably carried by body part 12 in a manner to be described hereinbelow.

Lower body part 12 is notched at the end thereof opposite lugs 16 for defining spaced-apart wall portions 26 having respective aligned openings 27 for rotatably receiving a pin 28. Pin 28 includes a transversely extending threaded bore 31 at the midpoint thereof for threading engagement with bolt 24. Rotation of the bolt varies the axial position of the same in pin 28; outward swinging movement of the bolt away from the body parts is permitted by rotation of the pin in the wall openings.

Upper body part 11 is provided with an open ended U-shaped recess at the end thereof opposite lug 13, which U-shaped recess is adapted for alignment with the notch in body part 12 defined by walls 26 when the upper and lower body parts are in opposed or clamped relationship as illustrated in FIG. 1. U-shaped recess 32 has a wall portion 32a at the bight portion thereof inclined inwardly of body part 11 and downwardly toward the lower body part as best seen in FIGS. 1 and 3. Stated another way, wall 32a may be described as including a central element extending from a point 32c to a point 32d (FIG. 1).

Upper body part 11 includes an integral externally threaded nipple portion 34, which nipple portion includes a centrally disposed threaded through bore 35. Bore 35 is adapted to extend generally radially of conduit 22 when body parts 11 and 12 are clamped to the conduit. An annular recess 36 is provided in body part 11 in concentric relationship with recess 20. Recess 36 includes a generally dished-out shoulder portion 36a for a purpose to be explained hereinbelow. Bore 35 is provided with a pair of diametrically oppositely disposed grooves 38 extending axially of the bore. Grooves 38 open into bore 35 along the length of the former and the grooves open at the outer end of bore 35. As noted in FIGS. 1 and 4, grooves 38 terminate short of annular recess 36. A cap 39 adapted for threading engagement with nipple portion 34 is provided for closing the outer end of bore 35. A sealing ring 40 is provided within cap 39 for forming a seal between nipple portion 34 and the cap when the latter is fully seated in place on upper body part 11.

A needle valve, generally designated 42, includes an externally threaded cylindrical portion 43, a coaxial conical portion 44, and a slotted head portion 45. As best seen in FIG. 4, the base portion of conical portion 44 has a diameter less than the root diameter of the threads on needle valve portion 43 for forming a downwardly facing annular shoulder 46 on the needle valve at the juncture between threaded portion 43 and conical portion 44. Annular shoulder 46 is flat and in a plane transverse to the longitudinal central axis of needle valve 42.

A resilient washer 48 of rubber or like deformable material is adapted to be received within annular recess 36 of upper body part 11. The washer includes a central opening 49 adapted to receive conical portion 44 of the needle valve. The self-piercing valve of FIGS. 1 through 4 is used as follows:

Piercing valve 10 is configured as illustrated in FIG. 4. That is, cap 39 is removed, needle valve 42 is rotated or backed-off until the tip or point of conical portion 44 lies within bore 35, and washer 44 is inserted in annular recess 36. Bolt 24 is rotated within threaded bore 31 in pin 28 until the end of the bolt opposite the head thereof is adjacent pin 28; movement of bolt 24 to this position permits free swinging movement of the bolt outwardly or away from lower body part 12, i.e., in a counterclockwise direction as seen in FIG. 4. The upper and lower body parts are then swung or rotated away from each other for freely and easily receiving conduit 22 between arcuate recesses 20 and 21. The upper and lower body parts are then swung toward each other or closed whereby conduit 22 is snugly received by the confronting arcuate recess in the upper and lower body parts. It will be understood that piercing valve 10 is designed to accommodate a conduit of a particular size, i.e., the radius of arcuate recesses 20 and 21 is substantially equal to the radius of the conduit to be received between the recesses. Piercing valve 10 is provided in various sizes to accommodate conduits of different sizes.

As arcuate recesses 20 and 21 are drawn into snug contact with the curved surfaces of conduit 22, resilient washer 48 readily conforms to the surface of the conduit. Dished-out portion 36a of the annular recess 48 allows the washer to conform freely to the curved surface of the conduit. After conduit 22 is received between opposed recesses of the upper and lower body parts, bolt 24 is swung to the position illustrated in FIG. 4, i.e., bolt 24 is swung into U-shaped recess 32, and the bolt is rotated for drawing the ends of the upper and lower body parts adjacent the bolt toward each other. It is during this step of clamping the body parts to conduit 22 that inclined wall portion 32a of U-shaped recess comes into play. As noted in FIG. 4, after bolt 24 is received within U-shaped recess 32 before the upper and lower body parts are brought into snug engagement with conduit 22, bolt 24 extends generally parallel with inclined wall 32a in substantial coextensive contact with the same. This permits bolt 24 to be fully seated within the U-shaped recess and to remain fully seated therein during rotation of bolt 24 for drawing the upper and lower body parts together. In other words, when the upper and lower body parts are fully drawn together, i.e., when bolt 24 is completely tightened in place, the threaded portion thereof is in contact with point 32c of the U-shaped recess; the portion of wall 32a adjacent point 32d does not prevent bolt 24 from fully seating in U-shaped recess 32 during clamping of the body parts to a conduit.

After the upper and lower body parts are securely clamped in place on conduit 22 by means of bolt 24, needle valve 42 is rotated by a suitable tool, such as a screw driver, for piercing of conduit 22 with conical portion 44 of the needle valve. Needle valve 42 is rotated or forced inwardly within bore 35 until annular shoulder 46 on the needle valve comes into contact with washer 48 adjacent the periphery of the central opening therein. As will be apparent from FIG. 1, this action of annular shoulder 46 engaging the washer 48 around the central opening therein, acts to force the inner portion of washer 48 into tight sealing engagement with the outer surface of conduit 22 around the opening formed therein. By the provision of flat annular shoulder 46, when the needle valve is fully seated in place there is absolutely no leakage of fluid in conduit 22 through the opening formed therein by the needle valve. Cap 39 is fully threaded in place; sealing ring 40 within the cap forms a double seal for the opening formed in conduit 22.

When it is desired to discharge or recharge fluid in the fluid system of which conduit 22 is a part, cap 39 is removed and a suitable tapping device is threadingly engaged with the external threads on nipple portion 34 of the upper body member. As it is known to those skilled in the art, such a tapping device includes a conduit portion for threading engagement with nipple portion 34, which conduit portion houses suitable means for rotating or backing-off needle valve 42 to allow communication between the hole formed in conduit 22 and the conduit portion of the tapping device. As best seen in FIGS. 1 and 4, passage of a fluid along bore 35 when the needle valve is in place therein is permitted by means of axially extending grooves 38. After the fluid in conduit 22 has been discharged or recharged, as the case may be, the tapping tool is removed from the nipple portion of the body part 11 (the needle valve will be fully seated with annular shoulder 46 thereof in firm contact with washer 48 before the tapping device is removed), and cap 39 is replaced on the nipple portion.

A modified piercing valve having self-contained means for actuation of its needle valve is shown in FIGS. 5 through 7. The modified valve, generally designated 55, includes separate, upper and lower body parts 56 and 57, respectively. Lower body part 57 includes open ended, vertically extending, notches 58 and 59 in respective opposite corners thereof defining wall portions 60 and 61. Body part 57 also includes integral journaled hub portions 62 and 63 at opposite ends thereof in alignment with wall portions 60 and 61, respectively. Wall 60 includes an opening for receiving one end of a pin 65, which pin has the other end thereof journaled within an opening in hub portion 62. In like manner, wall portion 61 includes an opening for receiving one end of a pin 66, which pin has the other end thereof journaled within the opening in hub portion 63. Pin 65 is provided with a transversely extending threaded bore 68 positioned along the length thereof for lying within notch 58, and bore 68 is adapted for threading engagement with a bolt 70. Pin 66 includes a transversely extending threaded bore 72 positioned along the length thereof for lying within notch 59, and bore 72 is adapted for threading engagement with a bolt 73. It will be apparent that rotation of bolts 70 and 73 results in axial positioning of the bolts within their respective pins, and it will be apparent that both bolts are adapted for swinging movement outwardly or away from the lower body part by reason of their associated pins being journaled within body part 57.

The upper and lower body parts are provided with arcuate or semicylindrical recesses 75 and 76, respectively, which recesses are of equal radius and adapted to confront each other when the upper and lower body parts are clamped together, as illustrated in FIG. 5, for defining a cylindrical opening to receive a conduit to be pierced. Manifestly, modified piercing valve 55 is adapted to receive a conduit having a radius equal to the radius of arcuate recesses 75 and 76. The modified piercing valve is provided with insert means adapting the valve for receiving a conduit having a radius less than the radius of arcuate recesses 75 and 76.

Such insert means includes a generally C-shaped member 77 having a stud portion 77a adapted to be received in a bore 78 provided in lower body part 76. It will be understood that C-shaped member 77 extends for the full length of arcuate recess 76. A second generally U-shaped insert member 79 is adapted to be seated within the opening defined by insert member 77 and arcuate recess 75. Insert member 79, which extends for the full length of arcuate recess 75, includes a U-shaped recess 79a for receiving a fluid conduit 80. Insert member 79 includes opposite, longitudinally extending shoulders 79b and 79c adapted for abutting engagement with end walls 77b and 77c, respectively, of insert member 77. It will be realized that the insert members may be varied in number and in shape for accommodating conduits of various sizes. It should be noted that stud portion 77a positions insert member 77 angularly and longitudinally in recess 76 and that abutting engagement of shoulders 79b and 79c with end walls 77b and 77c, respectively, positions insert member 79 angularly within the opening defined by recess 75 and insert member 77.

Upper body part 56 includes an integral, externally threaded head portion 82, which head portion includes a centrally disposed, threaded, through bore 83. Bore 83 includes a reduced-in-diameter portion 83a at the inner end thereof for defining a valve seat 83b in the bore. Upper body part 56 also includes an annular recess 85 at the inner end of reduced-in-diameter portion 83a, which annular recess is concentrically disposed with respect to bore 83 and includes a dished-out portion 85a for a purpose to be referred to hereinbelow.

The upper body part includes a transversely extending, externally threaded nipple portion 87, which nipple portion includes a centrally disposed passageway 88 communicating at the inner end thereof with bore 83 just above valve seat 83b. Passageway 88 opens at the outer end thereof exteriorly of the piercing valve; a cap 89 including a gasket 90 is threadingly engageable with nipple portion 87 for closing and sealing passageway 88.

A needle valve, generally designated 92, is provided in bore 83 of upper body part 56. Needle valve 92 has a threaded portion 93 along the length thereof adapted for threading engagement with the threads in bore 83, and the needle valve has a suitable handle 94 secured to the outer end of a shank portion 95 of the needle valve for operation or rotation of the latter. Needle valve 92 includes a first conical portion 97 at the inner end thereof joining with the cylindrical portion of the needle valve at a second conical portion 98, which second conical portion is adapted for coextensive contact with valve seat 83b when the needle valve is in its fully closed or seated position.

An internally threaded collar 100 is threadingly engageable with the external threads on head portion 82. Collar 100 includes a central opening 101 for freely receiving needle valve shank portion 95. A pair of sealing rings 102 and 103 in abutting relationship with each other and encircling shank portion 95 of the needle valve are held in place by collar 100. The lowermost portion of sealing ring 103 is seated within an annular recess 82a formed in head portion 82 in concentric relationship with bore 83. The sealing rings act to seal the outer end of bore 83 around the shank portion of the needle valve, and the sealing rings act as a stop for limiting outer movement of the needle valve during opening or backing-off of the latter.

As noted in FIG. 6, upper body part 56 is provided with a vertically extending through bore 105 in one corner thereof for receiving bolt 73. In FIG. 6 the head of bolt 73 is shown removed for better illustration of the construction of the upper body part. Nipple portion 87 includes an arcuate recess 106 for providing a flat annular surface at the top of the upper body part to receive the underside of the head of bolt 73. The opposite corner of upper body part 56 is provided with a vertically extending open ended U-shaped recess 108, which recess opens outwardly and laterally of the upper body part for receiving bolt 70. U-shaped recess 108 includes an inclined wall 108a at the bight portion thereof, which wall is inclined inwardly of the valve body and toward the lower part in the same manner as wall 32a of the recess of the embodiment of the piercing valve illustrated in FIGS. 1 through 4. As explained above in connection with piercing valve 10, this inclined wall of the U-shaped recess permits proper final positioning of the bolt in the U-shaped recess as the upper and lower body parts are clamped to a conduit.

A resilient washer 110, made of rubber or other suitable deformable material, is provided within annular recess 85 of the upper body part. Washer 110 is preferably provided with a central opening for receiving conical portion 97 of the needle valve. The modified piercing valve 55 is clamped to a conduit and used as follows:

Assuming the upper and lower body parts are clamped together prior to use, bolts 70 and 73 are rotated until their respective threaded ends are adjacent the corresponding pins journaled in the lower body part. Bolt 70 may then be rotated or swung out of U-shaped recess 108 in the upper body part. Loosening of bolt 73 permits separation between the upper and lower body parts, and swinging movement or rotation between the body parts is permitted by reason of pin 66 being journaled in the lower body part. In other words, after loosening both bolts and removal of bolt 73 from recess 108, the upper and lower body parts may be swung away from each other in the manner of the upper and lower parts of piercing valve 10 as illustrated in FIG. 4. With upper and lower body parts 56 and 57 disposed in the manner just described, a conduit to be pierced, such as conduit 80, may be quickly and easily received between the confronting recesses in the upper and lower body parts. Before conduit 80 is positioned between the upper and lower body parts, inserts 77 and 79 are secured in place for accommodating conduit 80 which has a radius substantially less than the radius of arcuate recesses 75 and 76. When conduit 80 is positioned within the U-shaped recess 79a of insert member 79, the upper and lower body parts are drawn together by means of bolts 70 and 73. As mentioned above, inclined wall 108a of U-shaped recess 108 permits proper final seating of bolt 70 within the U-shaped recess. During clamping of the upper and lower parts together on conduit 80, washer 110 conforms to the curvature of the conduit. Dished-out portion 85a of annular recess 85 permits the washer to conform freely to the curvature of the conduit.

After piercing valve 55 is securely clamped in place on conduit 80, needle valve 92 is rotated by means of handle 94 for piercing a hole in the conduit by conical portion 97 when it is desired to discharge or recharge fluid from the system of which conduit 80 is a part. Cap 89 is removed and a suitable conduit is threadingly engaged with nipple portion 87. The needle valve is then rotated or backed-off unseating conical portion 98 of the needle valve from valve seat 83b and withdrawing conical portion 97 of the needle valve from the hole pierced in the conduit. Communication is then permitted between conduit 80 and the conduit attached to nipple 87 by means of the hole formed in conduit 80, the opening in washer 110, reduced-in-diameter bore portion 83a, and passageway 88. When it is desired to close and seal the hole formed in the conduit, needle valve 92 is rotated for moving the same downwardly with bore 83 thereby seating conical portion 98 of the needle valve on valve seat 83b and re-positioning conical portion 97 in the washer and in the hole formed in the conduit. Escape of fluid within conduit 80 is prevented by seating of needle valve portion 98 on valve seat 83b, and by the sealing engagement of washer 110 on the surface of conduit 80 around the hole formed therein. The conduit attached to nipple portion 87 is removed and cap 89 replaced.

Figure 9:
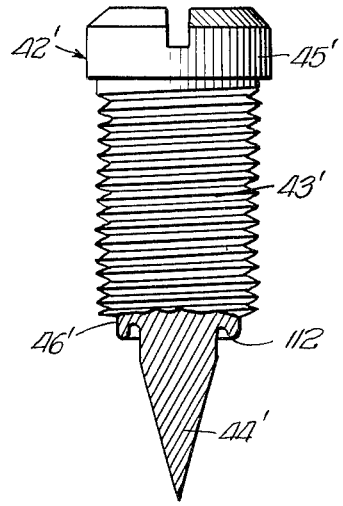
FIG. 9 is an enlarged side elevation of the needle valve of the modification shown in FIG. 8.

Another modified form of the self-piercing valve of this invention is illustrated in FIGS. 8 and 9. This modification is essentially the same as the embodiment of FIGS. 1 through 4 with the exception of the needle valve. Accordingly, the parts of the FIGS. 8 and 9 modification which correspond to the parts of the embodiment illustrated in FIGS. 1 through 4 are indicated by the prime form of numeral. Although this modification is essentially the same as the FIGS. 1 through 4 valve, it will be noted that the valve of FIGS. 8 and 9 is shown in clamping engagement with a conduit 22' of smaller diameter, relative to the valve, than conduit 22 of FIGS. 1 through 4. Because of this factor, upper body portion 11' does not include a semi-cylindrical recess corresponding to recess 20 of body member 11; rather, upper body portion 11' includes a recess 36' which confronts and communicates with semi-cylindrical recess 21' in lower body member 12'. Otherwise, the FIGS. 8 and 9 modification is the same as the FIGS. 1 through 4 embodiment with the exception of the needle valve.

Turning now to the needle valve 42' of the FIGS. 8 and 9 modification, the same will be seen to include a head 45', a threaded portion 43' and a conical portion 44'. Needle valve 42' also includes an annular shoulder 46' at the juncture of portions 43' and 44'. Shoulder 46' includes an integral, annular, continuous lip 112. This annular lip is adapted to engage the upper surface of sealing washer 48' around the central opening 49' therein.

Lip 112, which is rounded in crosss section, provides a reduced area in contact with the washer, as contrasted with the flat annular surface of shoulder 46 of the FIGS. 1 through 4 valve, and this increases the pressure between the lip and the washer for improving the seal between the latter and the needle valve. Actually, lip 112 becomes partially embedded in the washer, as indicated in FIG. 8, thereby adding to the effectiveness of the seal between the needle valve 42' and washer 48'. Also, lip 112 tends to clamp washer 48' in place and minimize the tendency of the latter to extrude or deform around the shoulder 46' upon turning needle valve 42' in place for sealing off the opening formed in the conduit 22'.

While the invention has been shown in but several forms it will be obvious to those skilled in the art that it is not to be so limited, but on the contrary, it is susceptible of other changes and modifications without departing from the spirit and scope of the appended claims.

I claim:

1. A piercing valve for piercing a fluid-carrying conduit comprising, a body including two separate parts adapted to extend transversely of a conduit and adapted to be clamped thereto in opposed relation one on each side of the conduit, which parts are swingably secured to each other at one of their respective adjacent ends and are provided with confronting arcuate recesses for receiving said conduit, one of said parts being provided at the other end thereof with a vertically extending notch opening at the ends thereof and opening laterally outwardly of said one part for defining a pair of parallel spaced-apart wall portions, which wall portions include aligned openings coaxial with an axis parallel with a longitudinal axis of said conduit, a pin having respective opposite ends journaled in said openings and having a transversely extending threaded bore along the length thereof between said wall portions, a bolt in threading engagement with said bore and adapted for swinging movement in a plane perpendicular to the longitudinal axis of said conduit, the other of said parts having at the other end thereof a U-shaped recess adapted for alignment with said notch when said parts are clamped to said conduit, which recess opens at opposite ends thereof and opens laterally outwardly of the body for receiving said bolt, the wall of said recess at the bight portion thereof being inclined inwardly of said body toward said one part, said body being provided with needle valve means in one of the parts thereof for piercing said conduit when said parts are clamped thereto.

2. A piercing valve for piercing a fluid-carrying conduit comprising, a body including two separate parts adapted to extend transversely of the conduit and adapted to be clamped thereto in opposed relation one on each side of the conduit, which parts are swingably secured to each other at one of their respective adjacent ends and are provided with confronting arcuate recesses for receiving said conduit, one of said parts being provided at the other end thereof with a vertically extending notch opening at the ends thereof and opening laterally outwardly of said one part for defining a pair of parallel spaced-apart wall portions, which wall portions include aligned openings coaxial with an axis parallel with a longitudinal axis of said conduit, a pin having respective opposite ends journaled in said openings and having a transversely extending threaded bore along the length thereof between said wall portions, a bolt in threading engagement with said bore and adapted for swinging movement in a plane perpendicular to said longitudinal axis, the other of said parts having at the other end thereof a U-shaped recess adapted for alignment with said notch when said parts are clamped to said conduit, which recess opens at opposite ends thereof and opens laterally outwardly of the body for receiving said bolt, the wall of said recess at the bight portion thereof being inclined inwardly of said body toward said one part, said other part including a through bore threaded along a portion of the length thereof and adapted to extend generally radially of said conduit when said parts are clamped to the conduit, said other part including an annular recess at the inner end of said through bore and in concentric relationship with the latter, said other part including at least one groove opening into said through bore and extending generally axially of the latter, which groove opens at the outer end of said through bore but terminates short of said annular recess, a needle valve having an externally threaded portion in threading engagement with said through bore and a coaxial conical portion at the inner end thereof for piercing a hole in said conduit, which conical portion has a base diameter less than the diameter of said threaded portion for defining an annular shoulder on said needle valve at the juncture of said portions, a resilient washer adapted to be received in said annular recess in concentric relationship therein, which washer has its central opening adapted to receive said conical portion, said washer being adapted to conform to the surface of said conduit when said parts are clamped to the former and said annular shoulder being adapted for substantially coextensive contact with said washer the periphery of the central opening therein for forcing said washer into sealing engagement with said conduit around the hold formed therein.

3. A piercing valve for piercing a fluid-carrying conduit comprising, a body including two separate parts adapted to extend transversely of the conduit and adapted to be clamped thereto in opposed relation one on each side of the conduit, means engageable with both of said parts at one of their respective adjacent ends for swingably securing the parts to each other, said means being adjustable for varying the spacing between said parts, said parts being provided with respective confronting arcuate recesses for receiving said conduit, one of said parts being provided at the other end thereof with a vertically extending notch open at the ends thereof and opening laterally of said one part for defining a pair of parallel spaced-apart wall portions, which wall portions include aligned opening coaxial with an axis parallel with a longitudinal axis of said conduit, a pin having respective opposite ends journaled in said opening and having a transversely extending threaded bore at the midpoint thereof, a bolt in threading engagement with said bore and adapted for swinging movement in a plane perpendicular to said longitudinal axis, the other of said parts having at the other end thereof a U-shaped recess adapted for alignment with said notch when said parts are clamped to said conduit, which recess opens at opposite ends thereof and opens laterally outwardly of the body for receiving said bolt, the wall of said recess at the bight portion thereof being inclined inwardly of said body toward said one part, said body being provided with needle valve means in one of the parts thereof for piercing said conduit when said parts are clamped thereto.

4. The valve according to claim 3 further defined by insert means detachably secured in one of said arcuate recesses, which insert means includes a curved recess for receiving a conduit having a radius less than the radius of said arcuate recesses.

5. In a self-piercing valve of the type including a valve body and means for clamping the same to a fluid-carrying conduit, which body is provided with a through bore extending generally radially of the conduit when the valve body is clamped thereto and opening at its inner end into a coaxially arranged, generally annular recess formed in the body, which bore is threaded at least along the portion of the length thereof, said body including passageway means opening into said bore at least adjacent said inner end thereof, a needle valve in said bore and including a threaded portion in threading engagement with the threads of the bore and a coaxial conical portion adjacent said threaded portion, which conical portion is adapted to pierce a hole in the conduit upon running the needle valve in said bore, and a sealing washer disposed in said annular recess, the improvement comprising, said needle valve being provided with an annular shoulder adjacent the juncture of its threaded and conical portions, which shoulder includes an integral, annular, continuous lip arranged to engage said washer for forming a seal between the latter and the needle valve.

References Cited by the Examiner
UNITED STATES PATENTS

| | | | |
|---|---|---|---|
| 773,710 | 11/1904 | Bronson | 285—198 X |
| 2,239,651 | 4/1941 | McMurray et al. | 285—197 |
| 2,287,354 | 6/1942 | Misch | 77—37 |
| 2,608,989 | 9/1952 | McDonald | 137—318 |
| 2,827,913 | 3/1958 | Wagner | 137—318 |
| 2,840,100 | 6/1958 | Stephenson | 137—318 |
| 3,038,490 | 6/1962 | Yocum | 137—318 |
| 3,115,889 | 12/1963 | Franck et al. | 137—318 |

ISADOR WEIL, *Primary Examiner.*

D. MATTHEWS, *Assistant Examiner.*